United States Patent [19]

Khanna et al.

[11] Patent Number: 5,122,592
[45] Date of Patent: Jun. 16, 1992

[54] PROCESS FOR IMPROVING THE PROPERTIES OF POLYTETRAFLUOROETHYLENE

[75] Inventors: Yash P. Khanna, Cedar Knolls; Georgette Chomyn, Denville; Rakesh Kumar, Budd Lake; Annemarie C. Reimschuessel, Morristown, all of N.J.

[73] Assignee: Allied-Signal Inc., Morristown, N.J.

[21] Appl. No.: 402,164

[22] Filed: Sep. 1, 1989

[51] Int. Cl.$^5$ .................. C08F 6/00; C08F 114/26
[52] U.S. Cl. .................. 528/481; 528/502; 526/255
[58] Field of Search .................. 528/481, 502, 503; 526/255; 264/331.14, 345

[56] References Cited

U.S. PATENT DOCUMENTS 4,159,370  6/1979  Koizumi et al. .............. 526/255 X
4,851,173  7/1989  Mackley et al. .............. 528/502 X

OTHER PUBLICATIONS

Fluoropolymers, Wall (ed.) J. Wiley and Sons, Inc., N.Y., pp. 381-382 (1972).
Textbook of Polymer Science, Billmeyer, Jr., J. Wiley and Sons., Inc., N.Y., 120-121, 1971.
B. Wunderlich, *Macromolecular Physics*, pp. 48, 49, 189, 218, vol. 3 (1980).
J. Grebowicz, "Thermal Properties of Drawn Polytetrafluoroethylene", *Journal of Applied Science*, vol. 38, pp. 707-716 (1989).

*Primary Examiner*—Fred Teskin
*Attorney, Agent, or Firm*—R. C. Stewart, II; G. H. Fuchs; D. L. Webster

[57] ABSTRACT

This invention relates to a process of preparing polytetrafluoroethylene comprising one or more fractions of polyethylene having a melting point of greater than about 340° C. by subjecting a polytetrafluoroethylene to a shear at elevated temperature.

22 Claims, 3 Drawing Sheets

PROCESS FOR IMPROVING THE PROPERTIES OF POLYTETRAFLUOROETHYLENE

BACKGROUND OF THE INVENTION

1. Field of the Invention

This invention relates to a process for modifying polytetrafluoroethylene and to modified polytetrafluoroethylene formed by the process. More particularly, this invention relates to a process for inducing high melting crystals in poly(tetrafluoroethylene).

2. Prior Art

Polytetrafluoroethylene exhibits useful properties over the widest temperature range of any known polymer. For a polymeric material polytetrafluoroethylene has a high virgin crystalline melting point of 342° C. This reported value which is higher than other reported melting point values is due to super heating effects. Sintered or melt-crystallized polytetrafluoroethylene, which does not super heat as much, shows a melting point at about 327° C. This equilibrium melting temperature ($T_m°$) i.e., the melting temperature of the most perfect crystals, is normally accepted as the melting point of poly(tetrafluoroethylene). B. Wunderlich, Macromolecular Physics-Crystal Melting, Vol. 3, pp. 48, 189 and 218, Academic Press, New York, New York (1980).

J. Grebowicz, "Thermal Properties of Drawn Polytetrafluoroethylene", Journal of Applied Polymer Science, Vol. 38, pp 707-716 (1989) describes certain experiments in which polytetrafluoroethylene is polymerized, drawn, sintered and annealed. It is reported that a high melting polytetrafluoroethylene having a melting point of 654K (381° C.) was observed.

SUMMARY OF THE INVENTION

This invention relates to a process for forming a polytetrafluoroethylene comprising one or more fractions of polytetrafluoroethylene having a melting point greater than about 340° C. More particularly, this invention relates to such a process which comprises:

subjecting polytetrafluoroethylene to shear having an "effective shear rate" at an "effective temperature" for a time sufficient to form polytetrafluoroethylene comprising one or more fractions of polytetrafluoroethylene having a melting point of greater than about 340° C. Another aspect of this invention relates to polytetrafluoroethylene comprising one or more fraction of polytetrafluoroethylene which melt at a temperature greater then about 340° C.

DESCRIPTION OF THE PREFERRED EMBODIMENTS

Figure 1:
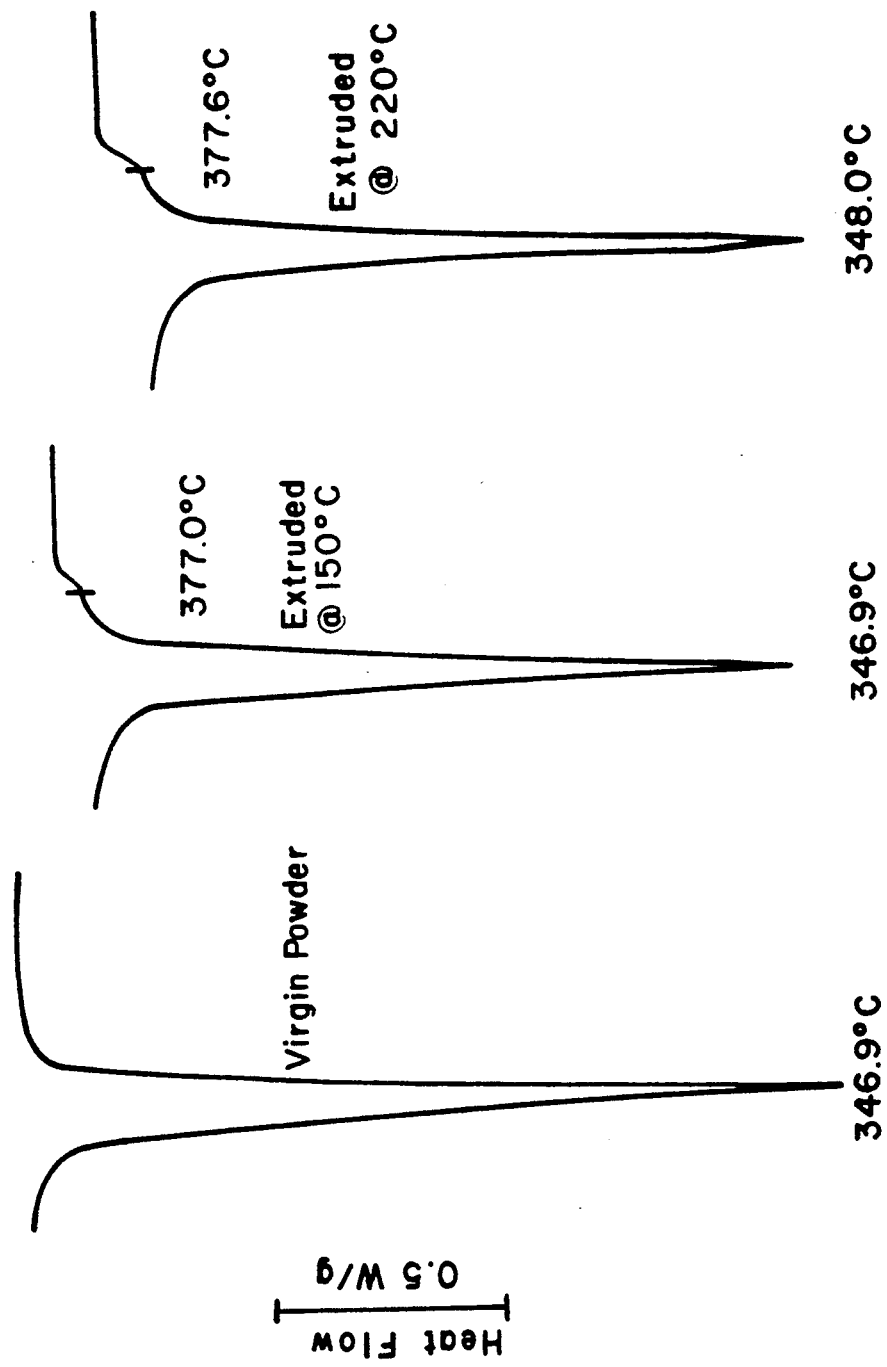
FIGS. 1 and 2 set forth differential scanning calorimeter heating curves showing the effect of shearing temperature on the melt behavior of polytetrafluoroethylene.

In the first step of the preferred embodiments of the process of this invention, polytetrafluoroethylene is heated to an "effective temperature". As used herein, an "effective temperature" is the temperature at which polytetrafluoroethylene can be subjected to an "effective shear" to provide polytetrafluoroethylene comprising one or more fractions of polytetrafluoroethylene which melt at a temperature of greater than about 340°. In general, an effective temperature is in the range of from about 335° C. to about 365° C. In the preferred embodiments of this invention, the effective temperature is from about 340° C. to about 360° C., and in the particularly preferred embodiments of the invention, an effective temperature is from about 345° C. to about 355° C. In the most preferred embodiments of the invention, an effective about 350° C.±2° C.

Polytetrafluoroethylene used in the process of this invention is not critical and conventional materials can be used. Such materials can be obtained from commercial sources or can be prepared in accordance with known techniques For example, polytetrafluoroethylene can be obtained commercially under a variety of trademarks such as Algoflon® (Montecatine), Fluon® (ICI), Hostaflon® (Hoechst), Polyflon® (Darkin Kogyo), Teflon® (DuPont) and Tetran (Pennwatt).

Methods of heating polytetrafluoroethylene to the effective temperature may vary widely, and any conventional polymer heating technique can be employed. Appropriate polymer heating means such as melt extrusion procedures, batch melting procedures and the like are well known in the art and will not be described herein in detail.

In the second step of the process of this invention, the heated polytetrafluoroethylene is subjected to a shear having an "effective shear rate". As used herein, "shear" is an action or stress resulting from applied force that causes or tends to cause two contiguous parts of the melt to slide relative to each other in a direction substantially parallel to their plane cf contact. As used herein, an "effective shear rate" is a shear rate [as shear rate is defined in Ferdinand Rodriguez, "Principles of Polymer Systems", McGraw-Hill Book Company, N.Y., (1982)]which is effective to provide polytetrafluoroethylene comprising one or more fractions of polytetrafluoroethylene having a melting point of greater than 340° C. In the preferred embodiments of the invention, the shear rate is from about 1 sec$^{-1}$ to less than about 10,000 sec$^{-1}$. In the particularly preferred embodiments of the invention, the shear rate is from about 1 sec$^{-1}$, to about 10,000 sec$^{-1}$ and in the most Preferred embodiments of the invention, the shear rate is from about 1 sec$^{-1}$ to about 500 sec$^1$A shear rate of from about 1 to 10 sec$^{-1}$ to about 100 sec$^1$ is the shear rate of choice.

Any method which can be used to shear a polymer melt or any liquid can be used. The method of choice is largely dictated by convenience. The shearing action can be provided by any appropriate method as for example by thermal shock, by pressure alteration, by ultrasonics or by mechanical means. Methods useful in shearing melts and liquids are known in the art, and will not be described in great detail. In one useful procedure, the polymer melt is sheared by thermal shock in which shearing is achieved by alternatively raising or lowering the temperature of the melt causing thermal expansions and resulting in internal stresses which cause the shear. In yet another useful procedure, the melt can be subjected to shear by electrical methods in which shear is achieved by high frequency electromagnetics waves impinging on the melt, and by electrical shock using waver amplitude and frequencies to cause shear. In still other procedures, shear is achieved by sudden pressure changes in pressure alterations methods; by ultrasonic techniques in which resonant vibrations which causes portions of the melt to vibrate or to be excited at different frequencies and thus shear; and mechanical means such as stirrers and extruders. These methods of shearing polymer melts are merely representative of useful methods, and any method known in the art for shearing a polymer melt or any liquid can be used.

In the preferred embodiments of the invention, mechanical shearing methods are employed such as by extrusion or injection molding. In the particularly preferred embodiments of the invention, shearing is achieved by introducing the polymer melt at one end of the extruder (single or double screw) and receiving the sheared polymer at the other end of the extruder. The temperature of the polymer melt, the length of the extruder, residence time of the melt in the extruder and the design of the extruder (single screw, twin screw, number of flights per unit length, channel depth, flight clearance, mixing zone etc.) are several variable which control the amount of shear to be applied.

The polytetrafluoroethylene provided by the process of this invention comprises one or more fractions of polytetrafluoroethylene having a melting point of greater than about 340° C. In the preferred embodiments of this invention, the polytetrafluoroethylene comprises one or more fractions of polytetrafluoroethylene having a melting point equal to or greater than about 350° C., and in the particularly preferred embodiments of the invention, the polytetrafluoroethylene comprises one or more fractions of polytetrafluoroethylene having a melting point equal to or greater than about 370° C.±10° C.

The amount of the high melting fraction contained in the polytetrafluoroethylene may vary widely. In general, the polytetrafluoroethylene contains greater than about 10 weight percent, based on the total weight of the polytetrafluoroethylene, of one or more fractions of polytetrafluoroethylene having a melting point of greater than about 340° C., preferably equal to or greater than about 350° C. In the preferred embodiments of the invention, the amount of the higher melting fractions is at least about 20 weight percent based on the total weight of the polytetrafluoroethylene, and in the particularly preferred embodiments, the amount is at least about 30 weight percent on the aforementioned basis. In the most preferred embodiments of the invention, the amount of the higher melting fractions of polytetrafluoroethylene is from about 30 or 90 weight percent to about 50 or 55 weight percent based on the total weight of polytetrafluoroethylene.

The polytetrafluoroethylene of this invention can be used for purposes for which conventional polytetrafluoroethylene is used. For example, the polytetrafluoroethylene of this invention can be used for fabricatings, coatings, and films, and in the fabrication of molded articles using conventional procedures. These uses and procedures are well known in the art and will not be described herein in any detail.

The following example is provided to more particularly illustrate the invention, and should not be construed as a limitation thereon.

EXAMPLE

Commercially available polytetrafluoroethylene powder was extruded through an Instron Capillary Rheometer. Extrusion temperatures were varied from 150° C. to 365° C. Die diameter and force were varied so as to obtain a shear rate range of from 3 to 10, 800 sec$^{-1}$.

Figure 2:
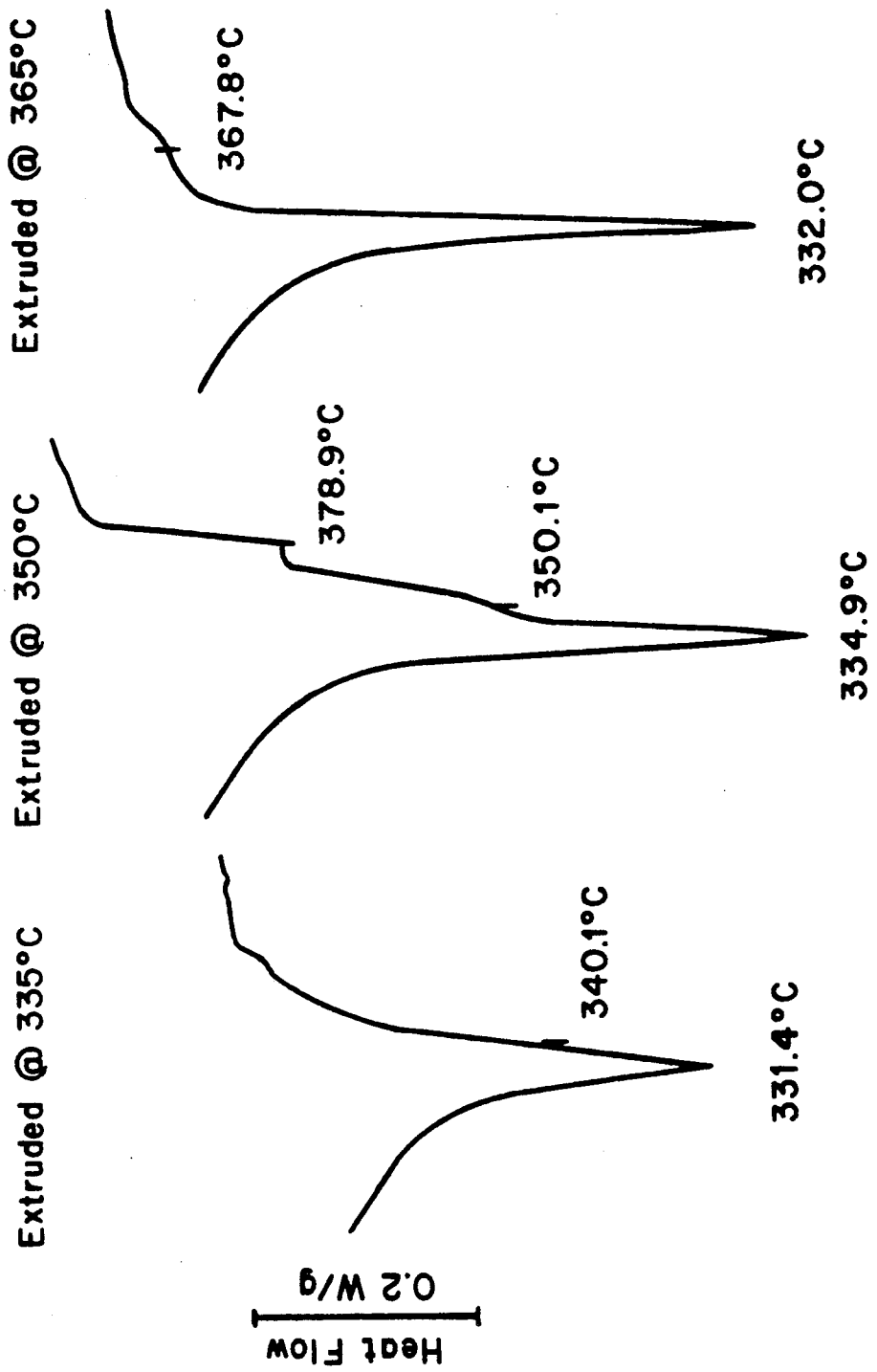
Figure 3:
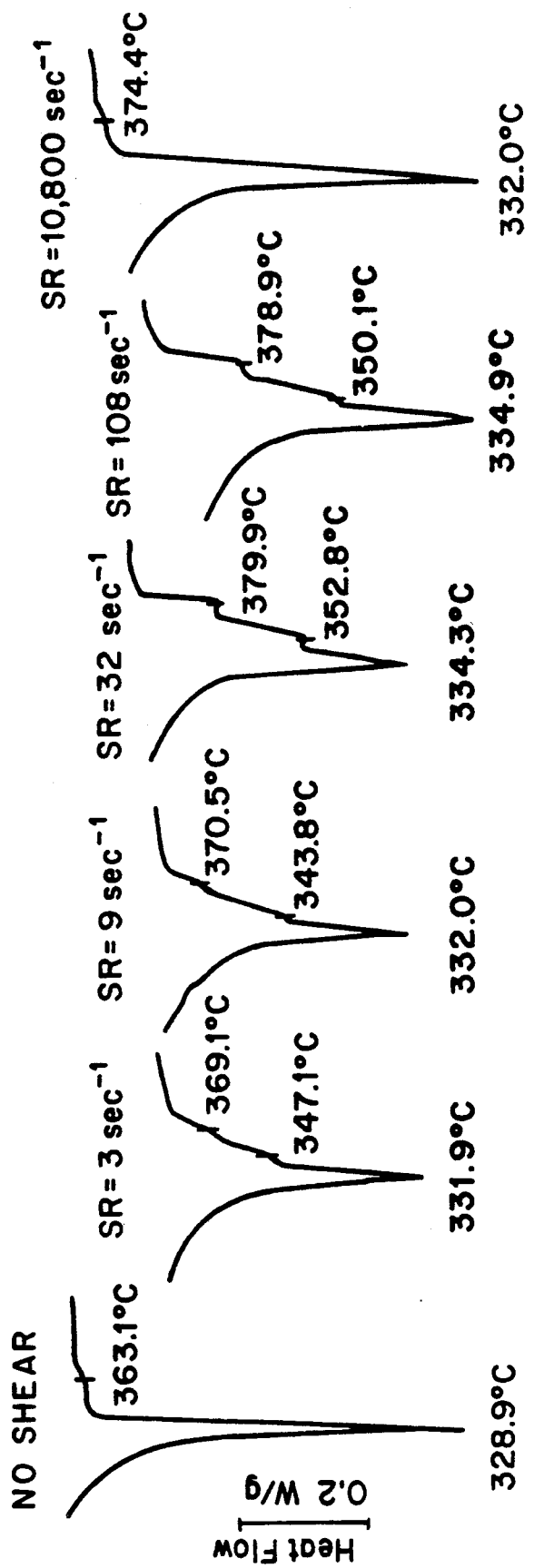
FIG. 3 sets forth differential scanning calorimeter heating curves showing the effect of shear rate on the melt behavior of polytetrafluoroethylene.

The extrudates obtained at different shear rates and different shear temperatures were analyzed for their melting behavior using a DuPont 9900 differential scanning calorimeter (DSC) in an argon atmosphere. A sample size of about 10 mg was used and heated at a program rate of 10 C/min. The results of these experiments are set forth in FIGS. 1, 2 and 3.

What is claimed is:

1. A process for forming poly(tetrafluoroethylene) comprising at least about 10 wgt % (based on the total weight of the poly(tetrafluoroethylene) of one or more fractions of poly(tetrafluoroethylene) having a melting point of from 340° C. to about 380° C. as measured by heating a 10 mg sample of the poly(tetrafluoroethylene) from room temperature at rate of 10° C./min using a differential scanning calorimeter in an argon atmosphere, said process comprising:

subjecting poly(tetrafluoroethylene) having a melting point of less than about 340° C. to a shear having an effective shear rate at an effective temperature equal to or greater than 340° C. for a time sufficient to form said poly(tetrafluoroethylene) comprising said one or more fractions.

2. The process of claim 1 wherein said shear rate is from about 1 sec$^{-1}$ to about 10,000 sec$^{-1}$.

3. The process of claim 2 wherein said shear rate is from about 1 sec$^{-1}$ to about 1,000 sec$^{-1}$.

4. The process of claim 3 wherein said shear rate is from about 1 sec$^{-1}$ to about 500 sec$^{-1}$.

5. The process of claim 4 wherein said shear rate is from about 1 to about 110 sec$^{-1}$.

6. The process of claim 5 wherein said shear rate is from about 1 sec$^{-1}$ to about 100 sec$^{-1}$.

7. The process of claim 1 wherein said temperature is from 340° C. to about 365° C.

8. The process of claim 7 wherein said temperature is from 340° C. to about 360° C.

9. The process of claim 8 wherein said temperature is from about 345° C. to about 355° C.

10. The process of claim 9 wherein said temperature is 350°±2° C.

11. The process of claim 1 wherein said polytetrafluoroethylene comprises one or more fractions having a melting point of from about 350° C. to about 380° C.

12. The process of claim 11 wherein said polytetrafluoroethylene comprises at least one fraction having a melting point of from about 360° C. to about 380° C.

13. The process of claim 1 wherein the amount of said one or more fractions is at least about 20 percent by weight based on the total weight of the polytetrafluoroethylene.

14. The process of claim 13 wherein said amount is from about 30 to about 55 weight percent.

15. The process of claim 14 wherein said amount is from about 30 to about 50 weight percent.

16. The process of claim 15 wherein said amount is from about 40 to about 50 weight percent.

17. A sintered poly(tetrafluoroethylene) comprising at least about 10 weight percent, based on the total weight of the poly(tetrafluoroethylene), of at least one fraction of poly(tetrafluoroethylene) having a melting point of from about 360° C. to about 380° C. as measured by heating a 10 mg sample of said poly(tetrafluoroethylene) from room temperature at a rate of 10° C./min using a differential scanning calorimeter in an argon atmosphere.

18. The poly(tetrafluoroethylene) of claim 17 wherein the amount of said one or more fractions is at least about 20 percent by weight based on the total weight of the poly(tetrafluoroethylene).

19. The poly(tetrafluoroethylene) of claim 17 wherein the amount of said one or more fractions is at least about 30 percent by weight based on the total weight of the poly(tetrafluoroethylene).

20. The poly(tetrafluoroethylene) of claim 19 wherein said amount is from about 10 to about 55 weight percent.

21. The poly(tetrafluoroethylene) of claim 20 wherein said amount is from about 30 to about 50 weight percent.

22. The poly(fluoroethylene) of claim 21 wherein said amount is from about 40 to about 50 weight percent.

* * * * *